Oct. 31, 1950  J. A. GROW, JR  2,527,927
LIQUID DISPENSING APPARATUS FOR CARBONATED BEVERAGES
Filed March 6, 1946

Joseph A. Grow, Jr.,
Inventor.
Haynes and Koenig,
Attorneys.

Patented Oct. 31, 1950

2,527,927

UNITED STATES PATENT OFFICE 2,527,927

LIQUID DISPENSING APPARATUS FOR CARBONATED BEVERAGES

Joseph A. Grow, Jr., St. Louis, Mo., assignor, by mesne assignments, to Marion L. J. Lambert, doing business as Crystal-Flo Products Company, St. Louis, Mo.

Application March 6, 1946, Serial No. 652,272

9 Claims. (Cl. 222—21)

This invention relates to liquid dispensing apparatus, and with regard to certain more specific features, to dispensers of carbonated water and flavoring mixtures for beverages and the like.

Among the several objects of the invention may be noted the provision of a simple flavored-carbonated-beverage dispenser in which a gravity feed of liquid flavoring may be obtained, although the main supply of the flavoring may be stored at a level lower than that required by the necessary hydraulic dispensing head; the provision of apparatus of the class described which with simple means employs the normal available carbonation pressure of carbonated water for pumping the flavoring from said lower level to the proper head for gravity feed; the provision of a dispenser of this class which reliably maintains conditions for a more constant ratio of carbonated water and flavoring in the desired beverage mixture; and the provision of apparatus of this class in which mixing of flavoring and carbonated water is obtained under sanitary conditions. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
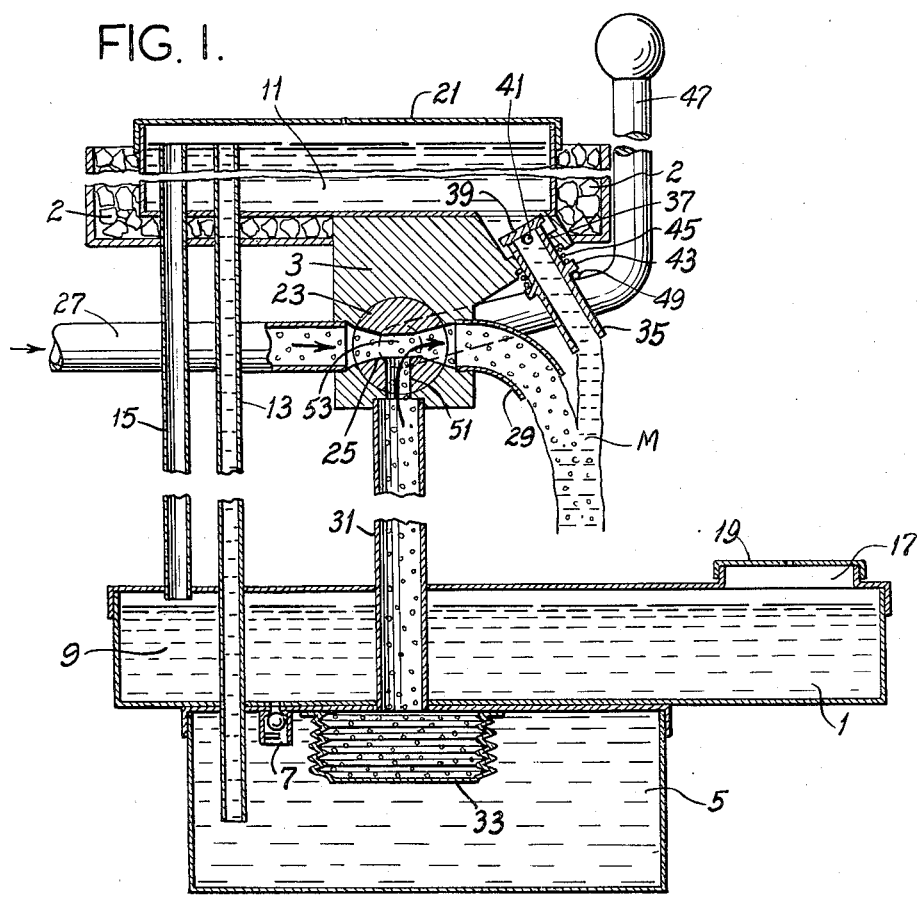
Figure 2:
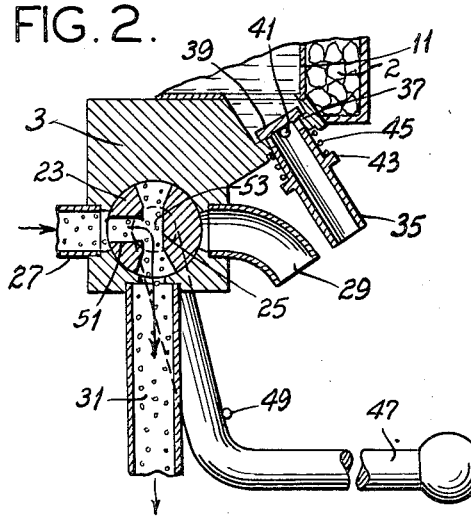

In the accompanying drawings, in which one of various possible embodiments of the invention is illustrated, Fig. 1 is a diagrammatic vertical section illustrating the invention; and, Fig. 2 is a fragmentary view similar to Fig. 1 but showing an alternative position of certain control valves.

Similar reference characters indicate corresponding parts throughout the several views of the drawings.

Referring now more particularly to the drawings, there is shown at numeral 1 a main tank for a bulk supply of flavoring syrup. This tank is most conveniently located below a dispensing head illustrated at 3. For example, the tank 1 may conveniently be located beneath a counter and the dispensing head 3 above the counter.

Beneath the tank 1 is a pump tank 5 which is connected with the tank 1 through a check valve 7, the latter allowing flow from the tank 1 to the tank 5 but not in the reverse direction. Numeral 9 indicates the syrup to be pumped. It is introduced through an opening 17 on which is a vented cap 19.

At numeral 11 is shown an auxiliary gravity-feed tank for the syrup. This tank 11 is located above the dispensing head 3. A supply pipe 13 connects the pump tank 5 and the gravity-feed tank 11. An overflow pipe 15 connects the gravity tank 11 with the main tank 1. The gravity tank 11 includes a vented cover 21.

The dispensing head 3 comprises a rotary three-way valve 23 in which is a T-shaped passage 25. This passage is arranged to connect a carbonated water line 27 either with an outlet nozzle 29 (Fig. 1) or a stand pipe 31 (Fig. 2). The pipe 31 passes downward into communication with a sealed flexible bellows 33 in the pump tank 5.

At numeral 35 is shown a hollow syrup-dispensing nozzle which is slidable through a valve seat 37. The nozzle 35 is provided with a valve head 39. Beneath this head are outlet ports 41 communicating with the hollow interior of the nozzle. The nozzle includes an extension 43 between which and the body of the head 3 is a compression spring 45. This spring normally biases the nozzle 35 downward, thus to seat the head 35 on the seat 37 and close off the port 41. This closes nozzle 35.

At numeral 47 is shown a handle attached to the valve 23 for rotating the latter. On this handle 47 is a lift finger 49 for contact with the extension 43 when the handle 47 is turned up to the Fig. 1 position. This lifts the nozzle and opens valve ports 39, 41. At this time the rotary valve 23 connects the pipe 27 with the nozzle 29 and also connects pipe 31 with the nozzle 29. When the handle 47 is shown (Fig. 2) the valve of nozzle 35 closes and valve 23 connects pipe 27 only with the pipe 31. It will be understood that the extension 43 reaches back far enough from the plane of the drawing to be contacted by the finger 49 without the latter interfering with the lower end of the nozzle 35.

The head portion 53 of the T-shaped passage through the three-way valve 23 is of venturi form as shown. Its stem 51 may be straight.

The venturi form is used for the passage 53 so that the flow, when the valve is in the Fig. 1 position, will tend to produce a low pressure area in the stem connection, or at least it will prevent application of any substantial pressure to 51, 31 and 33. This eliminates resistance against escape of fluid from the pipe 31 and bellows 33, or even aids such escape to the nozzle 29 when the valve is in the Fig. 1 position.

Operation is as follows:

The water in the pipe 27 is charged and is under superatmospheric pressure of a substantial amount. The auxiliary tank 11 is placed in heat exchange relationship with a suitable cooling medium such as ice 2.

When the valve 23 is in closed position (Fig. 2) the static pressure of the carbonated water is directed into the pipe 31 and thus into the bellows 33. This expands the bellows, thus applying pressure to the liquid within the pump tank 5. At this time valve 7 will close. Thus the syrup is forced up through the pipe 13 and into the auxiliary tank 11. Tank 11 may be referred to as an auxiliary dispensing reservoir. At this time the valve at 37, 39 is closed. Thus neither carbonated water nor syrup is flowing. At some position, the bellows 33 reaches a point of equilibrium, in which it will no longer expand, thus ending the pumping cycle. If more syrup has been raised than required for obtaining a predetermined level of liquid in the tank 11, it overflows through the pipe 15 and passes back to the main supply in the lower main tank 1. When the valve 23 is turned to the Fig. 1 position, carbonated water flows from pipe 27 to the nozzle 29. At the same time the valve 37, 39 is opened, thus allowing syrup to gravitate from the nozzle 35.

The flow through the venturi 53 reduces the pressure in the pipe 31 and bellows 33. Since the normal tendency of the bellows 33 is to contract, carbonated water is expelled from bellows 33, via pipe 31 and connection 51 and into the stream reaching nozzle 29. Thus the bellows 33 is made ready for a subsequent pumping.

Upon again closing the valve 23 a pumping cycle will be repeated, thus lifting more syrup to the tank 11 via pipe 13. This maintains a suitable supply of syrup in the dispensing reservoir 11 as long as there is a necessity for it. The bellows 33 pumps more than enough liquid for mixing one normal drink. This is to insure the presence of sufficient syrup in the dispensing reservoir to draw a larger than normal drink at any desired time. In order to provide for the excess syrup pumped to the dispensing nozzle during each cycle, the reservoir 11 is provided with the overflow 15 at such an elevation that the desired syrup excess is retained.

The outlets to the nozzles are so arranged that they are physically separated but the liquid streams therefrom meet at a point M where they commence mixing before they reach the glass (not shown) which is ordinarily placed below the nozzles. This physical separation between the outlets of the nozzles 29 and 35 is of importance. By physical separation is meant that they are separated to the extent that no capillary or equivalent action can occur in one nozzle respective to the fluid flowing from the other. Former mixing nozzles of this type had either common outlets or outlets with common portions over which capillarity could occur. Thus undesirable mold growth could occur on the nozzle outlets. Beverage syrups ordinarily have mold inhibitors in them so that mold growth will not occur in them per se. Mold will not grow in carbonated water per se, but mold may grow in beverage syrups diluted with carbonated water. Thus if conditions are allowed in which even a small portion of the syrup mixes with the carbonated water and is allowed to stand, mold growth is likely to occur. This is the case at the nozzles of older apparatus in which the syrup is brought into contact with the carbonated water before the two mediums leave the nozzles. For example, a few drops of even inhibited syrup and carbonated water adhering to nozzle outlets will start mold growth. Capillarity favors inter-travel of the liquids between any connected nozzles. Mold growth is not possible with the outside mixing means herein disclosed because all possible capillary connections are avoided between the nozzles.

The following advantages will be noted:

By dispensing the syrup by gravity from a tank such as 11, wherein the syrup is always at a substantially constant volume and head, several advantages are obtained.

The constant head assures a constant rate of flow of syrup from the nozzle 35, and since a constant pressure on the pipe 27 assures a constant rate of carbonated water flow, the resulting mixture of carbonated water and syrup will be constant. Also, by reason of the fact that the cooling means associated with the tank 11 is always operative upon a substantially constant mass of syrup in the tank 11, the viscosity of the syrup is maintained constant, and thus the weight of fluid flowing from nozzle 35 is constant per unit of time. If the syrup were to be cooled in the main tank 1, there would not be this constancy as the syrup is used up from the main tank 1, because as the volume becomes less the cooling function becomes different.

While the invention is particularly applicable to carbonated drink dispensers wherein carbonated water and flavoring syrup are used, it will be understood that it is also applicable to any apparatus having similar functional requirements, although operating with different fluids.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A multi-liquid dispenser comprising elevated means having a first outlet for a first liquid under superatmospheric pressure and having a second outlet for a second liquid, an upper tank above said second outlet for supplying said second liquid by gravity to the second outlet, a main tank for said second liquid and below the elevated means, a pump tank adapted to receive liquid by gravity from the main tank, a check valve for transferring said liquid only from the main tank to the pump tank, an expansible and contractible chamber in the pump tank, a connection from the pump tank to the upper tank through which liquid may be forced from the pump tank to the upper tank by expansion of said chamber, an overflow from the upper tank to the main tank, a connection from said expansible chamber to the elevated means, and a valve associated with said elevated means for selectively delivering the first liquid under pressure either to the first outlet or with the connection with said expansible chamber.

2. A multi-liquid dispenser comprising a dispensing head having a first outlet for liquid under superatmospheric pressure, and a second outlet for a second liquid, an upper tank above said second outlet for said second liquid, a main tank below the head for said second liquid, a pump tank adapted to receive liquid by gravity from the main tank, a check valve for transferring said liquid only from the main tank to the pump tank, an expansible and contractible chamber in the pump tank, a connection from the pump tank to the upper tank through which liquid may be forced from the pump tank to the upper tank by expansion of said chamber, an overflow duct from the upper tank to the main tank, a connection from said expansible chamber to the dispensing head, a first valve associated with said head for selectively communicating the first liquid under pressure either with its outlet or with the connection to said expansible chamber, a second valve in the second outlet, and common means for actuating the valves so arranged that when the first valve supplies liquid to the first outlet the second valve is open, and whereby when said first valve supplies liquid to the expansible chamber said second valve is closed.

3. An apparatus of the class described, a main tank, a pump tank adapted to receive liquid by gravity from the main tank, a check valve connecting said tanks and permitting flow only from the main tank to the pump tank, an elevated gravity-feed tank, a lift pipe from the pump tank to the gravity-feed tank, an overflow pipe from the gravity-feed tank to the main tank, expansible-chamber means in the pump tank whereby liquid may be forced from the pump tank through said lift pipe to the gravity feed tank, a source of liquid under pressure, an outlet for said liquid under pressure, a three-way valve adapted in one position to connect said source of liquid under pressure with said outlet, and in another position to connect the source with said expansible chamber means.

4. In apparatus of the class described, a main tank, a pump tank adapted to receive liquid by gravity from the main tank, a check valve connecting said tank permitting flow only from the main tank to the pump tank, an elevated gravity-feed tank, a lift supply pipe from the pump tank to the gravity-feed tank, an overflow pipe from the gravity-feed tank to the main tank, expansible and contractible chamber means in the pump tank, a source of liquid under pressure, an outlet for said source, a three-way valve having a T-shaped passage having a stem and a head forming a venturi; and means for positioning said three-way valve either to connect said source of liquid under pressure with its outlet through said venturi while connecting said source also with said chamber means through said stem, or to position the three-way valve so that the source of liquid under pressure is connected with said bellows partly through the venturi of the opening and partly through the stem of the opening, a second valve means for controlling flow from the second outlet, and common operating means for said valves whereby the second valve opens when the first valve is opened and whereby both valves close their outlets substantially simultaneously.

5. In apparatus of the class described, a source of one liquid under pressure, a pump for a second liquid, said pump including an expansible chamber means, a dispensing head having a connection with said source of liquid pressure, a second connection with said expansible chamber and a third connection with a discharge outlet, a movable three-way valve having a T-shaped passage the head of which is venturi shaped and the remainder of which constitutes a stem, said valve being adapted to be positioned either to connect the source of liquid under pressure with the discharge outlet through said venturi shaped portion and connecting with the expansible chamber through said stem, and adapted to be alternatively positioned to cut off the discharge outlet and to effect a communication between the source of pressure and said expansible chamber partly through said venturi connection and partly through said stem.

6. A beverage dispenser comprising a dispensing head having a carbonated water inlet, a carbonated water outlet and a flavoring material outlet, a gravity tank located to hold flavoring material above said dispensing head and feeding said last-named outlet, a control valve for said last-named outlet, a main tank below the head for flavoring material, a pump tank adapted to receive flavoring material by gravity from the main tank, a check valve allowing flow from the main tank to the pump tank but not vice versa, a lift pipe connecting said pump tank and the gravity tank, an overflow pipe connecting the gravity tank and the main tank, an expansible and contractible chamber means in the pump tank, a connection from said dispensing head to said expansible chamber, and a three-way valve in said head, including a venturi section and a stem section, the venturi section in one position of the valve being adapted to connect a carbonated water supply under pressure with said carbonated water outlet while also connecting said expansible chamber with the outlet, and said valve in another position being adapted to connect said carbonated water supply with the expansible chamber while cutting off the carbonated water outlet.

7. A beverage dispenser comprising a dispensing head having a carbonated water inlet, a carbonated water outlet and a flavoring material outlet, a gravity tank located to hold flavoring material above said dispensing head and feeding said last-named outlet, a control valve for said last-named outlet, a main tank below the head for flavoring material, a pump tank adapted to receive flavoring material by gravity from the main tank, a check valve allowing flow from the main tank to the pump tank but not vice versa, a lift pipe connecting said pump tank and the gravity tank, an overflow pipe connecting the gravity tank and the main tank, an expansible and contractible chamber means in the pump tank, a connection from said dispensing head to said expansible chamber, and a three-way valve in said head, including a venturi section and a stem section, the venturi section in one position of the valve being adapted to connect a carbonated water supply under pressure with said carbonated water outlet while also connecting said expansible chamber with the outlet, and said valve in another position being adapted to connect said carbonated water supply with the expansible chamber while cutting off the carbonated water outlet, and common means for operating both valves so that both of said outlets are substantially simultaneously opened or closed.

8. A multi-liquid dispenser comprising elevated means having a first outlet for a first liquid under superatmospheric pressure and having a second outlet for a second liquid, an upper tank above said second outlet for supplying said second liquid by gravity to the second outlet, a main tank for said second liquid and below the elevated means, a pump tank disposed below adapted to receive liquid by gravity from the main tank, a first valve for transferring said liquid only from the main tank to the pump tank, an expansible and contractible chamber in the pump tank, a connection from the pump tank to the upper tank, an overflow from the gravity tank to the main tank, a connection from said expansible chamber to the elevated means, and a second valve associated with said elevated means for optionally delivering the first liquid under pressure either to the first outlet or to the connection with said expansible chamber, said expansible chamber forcing liquid from the pump tank to the upper tank when said valve is positioned to deliver the first liquid to said expansible chamber.

9. A multi-liquid dispenser comprising a dispensing head having a first outlet for a first liquid under pressure and having a second outlet for a second liquid, a first tank above said second outlet for supplying said second liquid by gravity to the second outlet, a second tank for said second liquid below the dispensing head, a connection duct between said second tank and said first tank whereby to permit fluid flow therebetween, the upper end of said connection being above the normal liquid level in said first tank, a valve associated with said dispensing head for delivering the first liquid under pressure to the first outlet, handle means for operating said valve, and pumping means for delivering fluid from said second tank to said first tank by operation of said handle.

JOSEPH A. GROW, Jr.

REFERENCES CITED

The following references are of record in the file of this patent:

UNITED STATES PATENTS

| Number | Name | Date |
| --- | --- | --- |
| 1,240,023 | Brunk | Sept. 11, 1917 |
| 1,265,011 | Waterhouse | May 7, 1918 |
| 1,316,528 | Wooten et al. | Sept. 16, 1919 |
| 1,919,616 | Boyd | July 25, 1933 |
| 2,039,564 | Smith | May 5, 1936 |